Feb. 12, 1952　　　F. JACCARINO ET AL　　　2,585,326
TERMINAL FOR WRISTBANDS FOR WATCHES
Filed Jan. 30, 1950
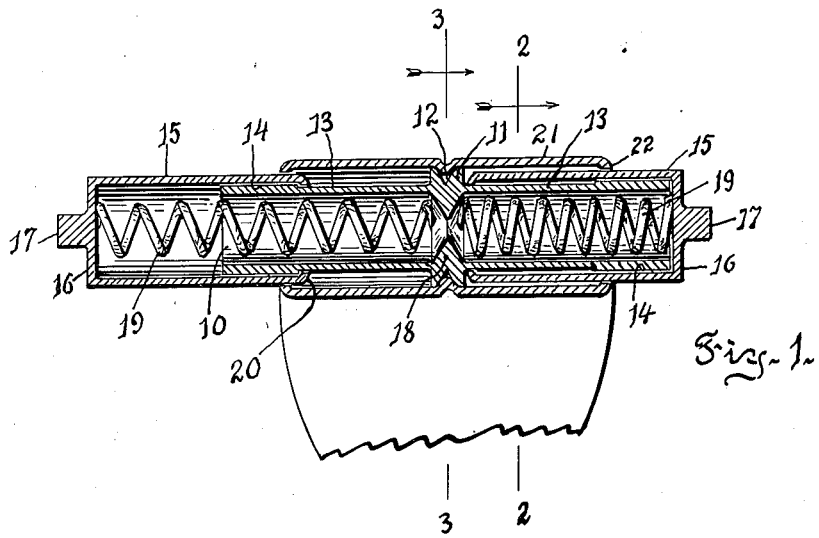
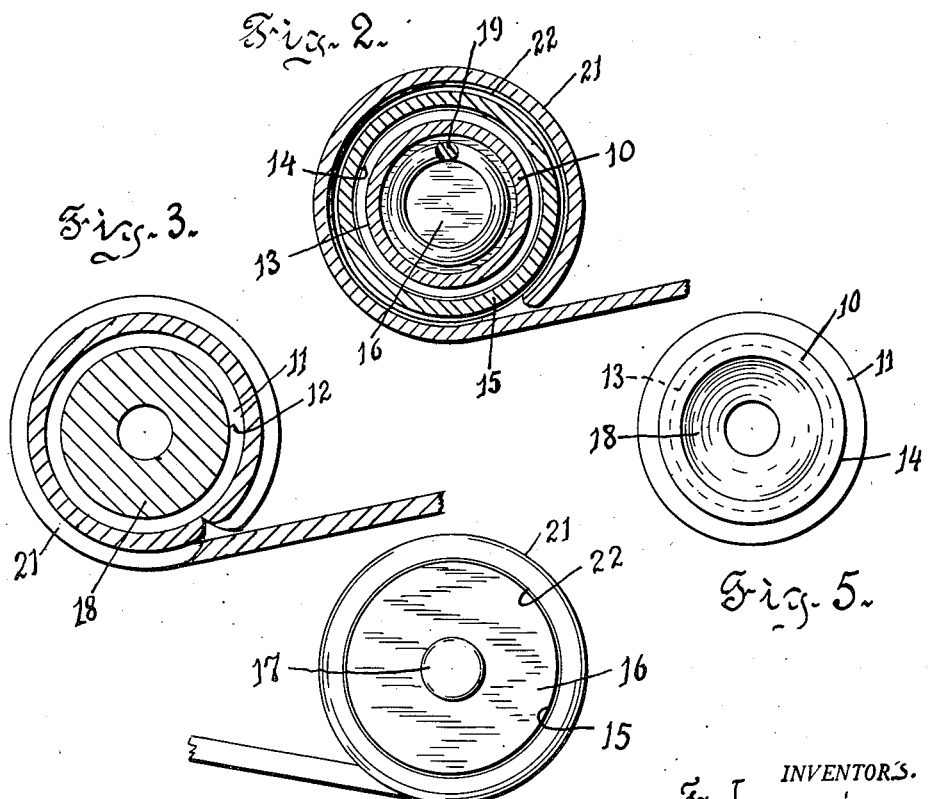
INVENTORS.
F. Jaccarino
A. Pinson
BY
Their Attorney Patented Feb. 12, 1952

2,585,326

UNITED STATES PATENT OFFICE 2,585,326

TERMINAL FOR WRISTBANDS FOR WATCHES

Frederick Jaccarino, Stamford, and Alfred Pinson, Riverside, Conn., assignors to Apex Accessories Co., Inc., Greenwich, Conn.

Application January 30, 1950, Serial No. 141,269

3 Claims. (Cl. 24—265)

Our invention relates to terminals for wrist bands for watches and is an improvement over the structure disclosed in our patent application, Serial No. 113,988, filed September 3, 1949, now Patent No. 2,576,684.

The object of the invention is to provide a terminal that can be preassembled completely before securing it to the ends of the band. Another object of the invention is to provide a terminal for the end of a wrist band for watches in which the securing means of the band to the terminal provides additional guiding means for said terminal.

Generally the ends of a wrist band for a watch case terminate in a tube, into which expanding pins are fitted in accordance with the spread of the facing arms of the watch case. In consequence, it is necessary to stock with expanding pins of different lengths. Our object is to obviate this necessity and provide the ends of the band with expanding pins that will take care of the variety of watch cases generally encountered in the trade.

In the appended drawing forming part of this application, Figure 1 is enlarged eight times the original size, while Figures 2 to 5 inclusive are enlarged sixteen times the original size:

Figure 1 is a section on line 1—1, Figure 2;

Figure 2 is a vertical section on line 2—2, Figure 1;

Figure 3 is a similar section on line 3—3, Figure 1;

Figure 4 is an end elevation of the terminal; and

Figure 5 is an end elevation of the stem.

In Figure 1 the right side of the terminal is shown fully telescoped in, while the left side is fully out.

In the figures, 10 is a tubular stem provided midway between the ends thereof with a hub 11 having a peripheral annular groove 12, preferably V-shaped in cross-section. A portion 13 of the outer, cylindrical peripheral surface of the stem 10 to each side of the hub is of a reduced diameter to form annular end collars 14 near each end of the stem. Each collar serves as a bearing for a corresponding sleeve 15 capping the corresponding open end of the stem 10. Each outer end of the sleeve 15 is closed by an end wall 16, from which extends outwardly a trunnion 17 for engaging a watch to be attached.

The stem 10 is preferably reinforced within its bore by a partition 18 located under the hub 11, and therefore coplanar with it. The purpose of the partition is to add strength to the stem at the hub and also to serve as an abutment for the ends of expansion springs 19, each actuating a corresponding sleeve 15.

The telescoping movement of each sleeve 15 on the corresponding end collar 14 by a corresponding spring 19, is limited by the engagement of the inwardly lipped end 20 of the sleeve 15 with the corresponding inner end of collar 14. The lipped end 20 of each sleeve provides additional guiding for the sleeve on the reduced portion 13 of the stem 10. The inward movement of the sleeves is limited either by the engagement of a wall 16 of a sleeve or by the side of the hub with the proximate lipped end of the corresponding sleeve.

The lipped ends 20 of the sleeves are turned inwardly after the sleeve has been mounted on a corresponding end of the stem 10 housing therein the spring.

The unit so far described comprises the stem, the springs housed therein, and the sleeves capping the ends of the stem that encloses the spring and which sleeves have their open ends lipped as described to prevent the unit from separating into parts. When it is desired to attach such a unit to the end of a wrist band, a flat portion of the band is then shaped into a drum or sleeve 21. The drum is then centralized with the hub of the stem 10, and a portion of the metal of the drum overlying the groove is rolled into the V-groove 12 of the hub, thereby anchoring the drum of the band to the hub of the stem. The open ends of the drum are rolled inwardly to form end lips 22, which provide additional guide for the corresponding sleeves 15 projecting therethrough. These end lips 22 may be dispensed with, and the inner drum surface may be used as a guide. From Figure 1 it will be seen that the drum 21 is shorter than the stem 10, so that the end of the drum through which the sleeve 15 projects and in which end the sleeve 15 bears is supported by the stem 10 lying within the sleeves 15. Thus accidental rocking of the drum on the hub is prevented when the trunnions 17 engage the arms of a wrist watch.

The partition 18 in the bore of the stem may be eliminated, and a single expansion spring may be used in lieu of the two shown in Figure 1 of the drawing, in which case the end of the single spring will abut the corresponding end wall 16 of the sleeves 15.

By providing a completely assembled terminal unit we are able to reduce the inventory stock of bands and terminals, as, in accordance with the demand of the type of band required, the same can be easily and quickly coupled with the terminals to be supplied; whereas, if the terminals were directly mounted on the end of the band, the bands for which the demand decreases would overload the stock.

Although the drawings show the parts of the terminal of cylindrical cross-section, the parts of the terminal are not limited to this type of cross-section, as the stem, the sleeves, and the drum could be of any angular cross-section corresponding to the type, form and construction of the watch band for which the terminal is intended.

We claim:

1. A wrist band terminal comprising a tubular stem having a hub between the ends thereof, a sleeve capping each end of the stem and mounted to telescope on the corresponding end, a spring housed in the stem and the sleeves for moving the sleeves on the stem away from the hub, said stem and sleeve having means limiting the telescopic movement of the sleeves on the stem in either direction, and a drum-shaped band end anchored to the hub median of its ends, said drum engaging the outer periphery of the sleeves to form guiding means therefor in addition to the guiding means formed for the sleeves on the stem, said sleeves having trunnions on the outer ends thereof for engaging the arms of a wrist watch.

2. A wrist band terminal comprising a tubular stem having a hub between the ends thereof, said stem having a reduced outer diameter between the hub and the ends to form end collars thereon, a sleeve capping each end of the stem and bearing on the corresponding collar, the end of the sleeve proximate to the hub being lipped inwardly on to the corresponding reduced part of the stem, a spring housed in the stem and sleeves for moving the sleeves away from the hub, said lipped end of each sleeve adopted to engage the corresponding collar end to prevent the separation of the stem and the sleeves, and a drum end of a wrist band anchored to the hub between the ends of said drum, said drum providing guiding means for the outer periphery of the sleeves to the proximity of the inner collar ends of the stem within the sleeves, each of said sleeves having a trunnion on the outer end for engaging the arms of a wrist watch.

3. A wrist band terminal comprising a tubular stem having a hub between the ends thereof, said stem having a reduced outer diameter between the hub and the ends of the stem to form end collars on the stem, a sleeve capping each end of the stem and bearing on the corresponding collar, the ends of the sleeve proximate to the hub being lipped inwardly on to the reduced part of the stem, said stem having a partition within the bore thereof coplanar with the hub, a spring to each side of the partition within the stem engaging the corresponding sleeve for normally moving the sleeve away from the hub, said lipped end of each sleeve adopted to engage the corresponding collar end to prevent the separation of the stem and the sleeves, and a drum-shaped end of a band anchored to the hub of the stem median of its ends, said drum having lipped ends to form bearings for the corresponding outer periphery of the sleeve engaged therein, the lipped end of said drum extending beyond the inner collar end of the stem within the sleeves, said sleeves having trunnions on the outer end for engaging the arms of a wrist watch.

FREDERICK JACCARINO.
ALFRED PINSON.

REFERENCES CITED

The following references are of record in the file of this patent:

UNITED STATES PATENTS

| Number | Name | Date |
|---|---|---|
| 2,012,054 | Ritter | Aug. 20, 1935 |
| 2,254,755 | Sand | Sept. 2, 1941 |
| 2,382,249 | Megar | Aug. 14, 1945 |